(No Model.) 2 Sheets—Sheet 1.
P. J. McELROY.
METHOD OF MAKING MULTIPLE BORE GLASS TUBES.
No. 466,894. Patented Jan. 12, 1892.
Fig. 1.
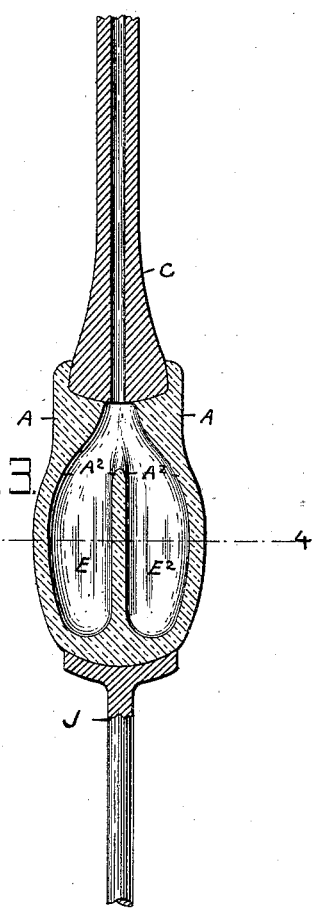
Fig. 3.
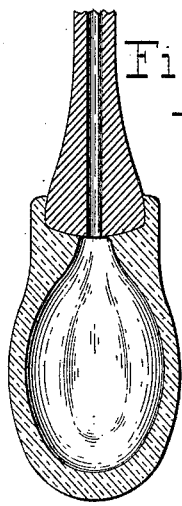
Fig. 2.
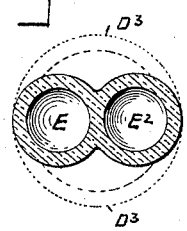
Fig. 4.
Fig. 8.
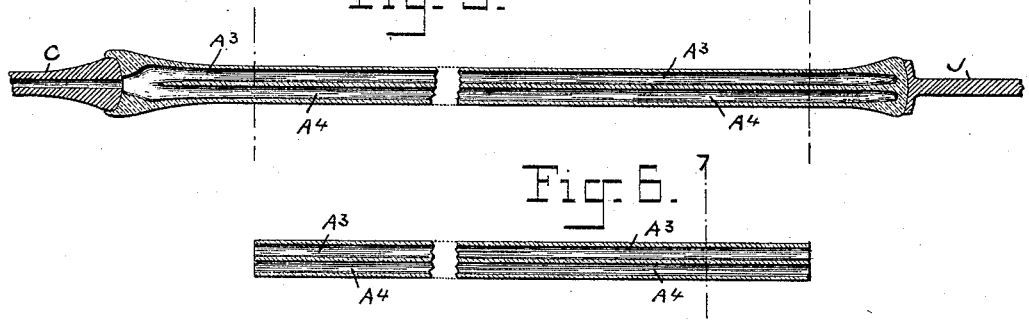
Fig. 5.
Fig. 6.
Fig. 7.
Witnesses.
John F. Nelson,
Marion E. Brown
Inventor.
Patrick J. McElroy
by his Attorneys
Brown Bros (No Model.) 2 Sheets—Sheet 2.
P. J. McELROY.
METHOD OF MAKING MULTIPLE BORE GLASS TUBES.
No. 466,894. Patented Jan. 12, 1892.
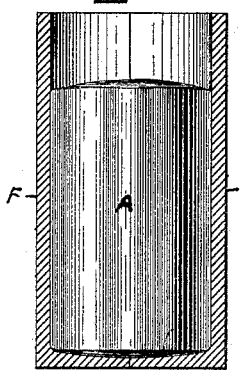
Fig. 1<sup>A</sup>
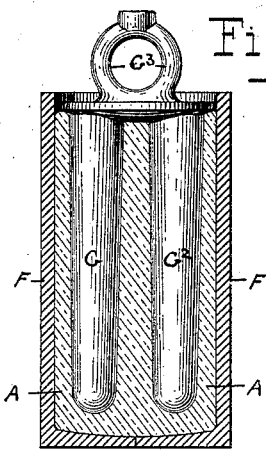
Fig. 2<sup>A</sup>
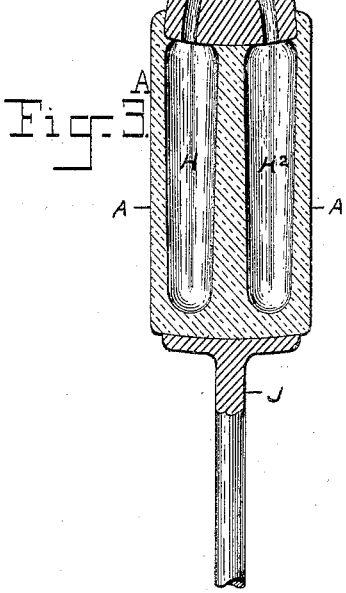
Fig. 3<sup>A</sup>
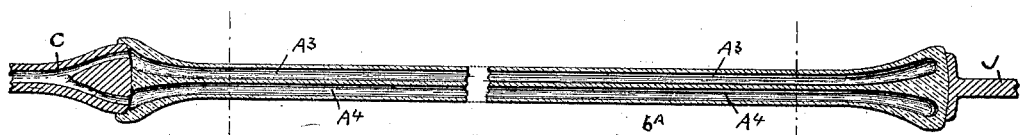
Fig. 4<sup>A</sup>
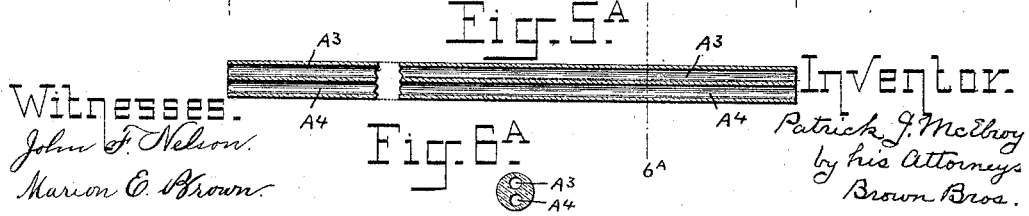
Fig. 5<sup>A</sup>
Fig. 6<sup>A</sup>
Witnesses.
John F. Nelson.
Marion E. Brown.
Inventor.
Patrick J. McElroy
by his Attorneys
Brown Bros.

UNITED STATES PATENT OFFICE.

PATRICK J. McELROY, OF CAMBRIDGE, MASSACHUSETTS.

METHOD OF MAKING MULTIPLE-BORE GLASS TUBES.

SPECIFICATION forming part of Letters Patent No. 466,894, dated January 12, 1892.

Application filed April 25, 1891. Serial No. 390,499. (No model.)

*To all whom it may concern:*

Be it known that I, PATRICK J. MCELROY, a citizen of the United States of America, and a resident of the city of Cambridge, in the county of Middlesex and State of Massachusetts, have invented a certain new and useful Improved Method of Making Multiple-Bore Glass Tubes, of which the following is a full, clear, and exact description.

This invention relates to a method of producing from a mass or ingot of glass a continuous tube with a series of distinct and separated and continuous longitudinal passages.

The method of this invention consists, first, in molding, blowing, or otherwise suitably forming in an ingot or mass of glass in suitable condition therefor a series of separated chambers or cavities which are severally open at one end and preferably closed at the other end of the ingot, and then, by means of a blowing iron or irons or other suitable appliance held on said open end and in communication with said several chambers of the ingot, forcing or blowing air into said chambers, and, by means of a punty or working-rod or other suitable appliance held on the ingot, as well known, and simultaneously with said blowing of the ingot distending or drawing out the ingot into a continuous length and exteriorly into a cylindrical or other such like form and interiorly into distinct and separated continuous longitudinal passages in number and relative location corresponding to that of said chambers of the ingot.

In the drawings forming part of this specification, Figures 1 and 1$^A$ are each a side view of an ingot of glass. In Fig. 1$^A$ this ingot is in a mold shown in central vertical section. Fig. 2 is a vertical section showing the ingot, Fig. 1, as having a single chamber open at one and closed at the other end, and of a blowing-iron broken off and held on and in communication with said chamber at its said open end. Fig. 2$^A$ is a vertical section of the mold and ingot, Fig. 1$^A$, and a side view of two solid metal plungers or cores entered into the ingot, so that on their being withdrawn to leave in the ingot two molded distinct and separated chambers or cavities at one end open and at the other end closed. Figs. 3 and 3$^A$ are each similar vertical sections of an ingot of glass having two distinct and separated chambers or cavities, both at one end open and at the other end closed, and of a blowing-iron (broken off) held on the ingot at said open end of its chambers and of a punty or working rod held on the closed end of said ingot. Fig. 4 is a horizontal section, line 4 4, Fig. 3. Figs. 5 and 4$^A$ are each central longitudinal sections of the chambered ingot, respectively Figs. 3 and 3$^A$, after each ingot has been further treated by a blowing-iron and a working rod in accordance with the method of this invention and before detaching said tools. Figs. 6 and 5$^A$ are longitudinal sections similar to Figs. 5 and 4$^A$, but with the blowing-irons and working rods removed and the extreme ends of the ingots, Figs. 5 and 4$^A$, respectively, cut off and trimmed. Figs. 7 and 6$^A$ are cross-sections, respectively, line 7 7, Fig. 6, and line 6$^A$ 6$^A$, Fig. 5$^A$. Fig. 8 is a cross-section having four distinct and separated chambers in lieu of two, as shown in the figures of the drawings, before explained.

In carrying out this invention the chambers or cavities B of the ingot A of glass can be made as follows, to wit: by first using a blowing-iron C, blowing the ingot A into a bulb D with a single chamber D$^2$, Fig. 2, and then joining the opposite side walls D$^3$, dotted lines, Fig. 1, of the bulb-chamber D$^2$, and so making its said chamber into two separated and distinct chambers E E$^2$, Figs. 3 and 4, each at one end A$^2$ open and preferably at the other end A$^3$ closed, or, again, by molding the glass in a mold F, Fig. 1$^A$, into an ingot A and either at the same time or thereafter, by inserting or forcing metal plungers or cores G G$^2$ into the glass in the mold, forming in the ingot, as shown, Fig. 3$^A$, (the plungers being removed,) two separated and distinct chambers or cavities H H$^2$, one for each plunger and each at one end open and preferably each at the other end closed. Preferably both plungers are attached to a common head G$^3$, suitably adapted to be conveniently handled. Each of the chambered ingots described first is secured, Figs. 3 and 3$^A$, at the open end of its said chambers to a blowing-iron C, suitable for communication by its air passage or passages with both chambers of the ingot, and it is also attached at the opposite end to one end of a punty or working rod J, and then by blowing or forcing air through the blowing-iron into said chambers and simultaneously therewith by means of the punty the ingot is continuously drawn out and distended, all so that the ingot is reduced to a continuous length, exteriorly of cylindrical or other such like form and interiorly with two distinct and separated and longitudinal continuous passages $A^3$ $A^4$, Figs. 5 and $4^A$, on which the tools—blowing-iron and punty—are removed. Preferably the tubes of Figs. 5 and $4^A$, on removal of the tools, as stated, are trimmed off in any suitable manner at their ends. (See Figs. 6, 7, $5^A$, and $6^A$.)

Obviously in the practice of this invention the ingots A, preparatory to being blown and distended, can be in either of the ways explained formed with more that two separated and distinct chambers E $E^2$—as, for instance, with four, Fig. 8—and from such an ingot the tube produced would have four continuous separated and distinct passages.

Tubes such as described and shown form the subject-matter of a separate application, Serial No. 353,635, for Letters Patent of the United States.

It will be observed that, while two specific ways have been particularly described and shown as practical for carrying out the method of this invention, the invention is not to be limited in that relation, and, again, that in all handling of the glass, as described, the glass is to be in a condition suitable therefor, and also otherwise than particularly explained, it is to be treated as well-known in molding, blowing, and drawing glass.

Having thus described my invention, what I claim, and desire to secure by Letters Patent, is—

A method of producing glass tubes of a continuous length and with a series of distinct and separated longitudinal continuous passages, consisting, first, in forming in an ingot of glass a series of separated chambers or cavities at one end open, and then in forcing or blowing air into said chambers or cavities and simultaneously therewith distending or drawing out said ingot into a continuous length and said chambers of the ingot into distinct and separated continuous longitudinal passages, substantially as described, for the purposes specified.

In testimony whereof I have hereunto set my hand in the presence of two subscribing witnesses.

P. J. McELROY.

Witnesses:
ALBERT W. BROWN,
MARION E. BROWN.